United States Patent [19]
Moss et al.

[11] Patent Number: 5,162,927
[45] Date of Patent: Nov. 10, 1992

[54] HIGH EFFICIENCY HOLOGRAMS BY MULTIPLE-LAYER HOLOGRAPHY

[75] Inventors: Gaylord E. Moss, Marina Del Rey; John E. Wreede, Monrovia; Edward T. Knobbe, Playa Del Rey; Darrell F. Hatch, Palmdale, all of Calif.

[73] Assignee: Hughes Aircraft Company, Los Angeles, Calif.

[21] Appl. No.: 207,084

[22] Filed: Jun. 15, 1988

[51] Int. Cl.⁵ .................... G03H 1/28; G02B 5/32
[52] U.S. Cl. ........................ 359/3; 359/15; 359/22; 359/24; 359/900; 430/1; 430/2
[58] Field of Search .......... 350/3.6, 3.61, 3.70, 350/320, 3.75, 3.77; 430/1, 2; 359/3, 15, 22, 24, 900

[56] References Cited

U.S. PATENT DOCUMENTS

| | | | |
|---|---|---|---|
| 4,029,507 | 6/1977 | Wehner et al. | 350/3.6 |
| 4,187,106 | 2/1980 | Gladden | 430/1 |
| 4,245,882 | 1/1981 | Chang | 350/3.77 |
| 4,329,409 | 5/1982 | Wreede et al. | 430/1 |
| 4,420,218 | 12/1983 | Rubanov et al. | 350/3.77 |
| 4,510,221 | 4/1985 | Gorin et al. | 430/1 |
| 4,601,533 | 7/1986 | Moss | 350/3.7 |
| 4,637,678 | 1/1987 | Moss et al. | 350/3.7 |
| 4,789,211 | 12/1988 | Wreede | 350/3.61 |
| 4,795,223 | 1/1989 | Moss | 350/3.75 |
| 4,799,746 | 1/1989 | Wreede | 430/2 |
| 4,808,500 | 2/1989 | Wreede et al. | 430/1 |
| 4,815,800 | 3/1989 | Chern et al. | 350/320 |
| 4,826,290 | 5/1989 | Wreede et al. | 350/320 |
| 4,853,306 | 8/1989 | Wreede et al. | 430/2 |
| 4,854,674 | 8/1989 | Wreede | 350/3.7 |

*Primary Examiner*—Bruce Y. Arnold
*Assistant Examiner*—R. D. Shafer
*Attorney, Agent, or Firm*—Leonard Alkov; Wanda Denson-Low

[57] ABSTRACT

A method is disclosed for forming a multi-layer holographic device 22. A first hologram is formed on a major surface of a substrate 14. The first hologram is desensitized to prevent interaction with a second subsequently formed hologram. The second hologram is formed conterminous with said first hologram.

15 Claims, 1 Drawing Sheet

HIGH EFFICIENCY HOLOGRAMS BY MULTIPLE-LAYER HOLOGRAPHY

BACKGROUND OF THE INVENTION

1. Technical Field

This invention relates to fabrication of holographic devices. More particularly, this invention relates to fabrication of holographic devices employing multiple holograms.

2. Background of the Invention

In recent years, there has been an increased use of lasers, and other light sources, in commercial and military applications. Some of the more recent applications of lasers include, without limitation, communication systems, imaging systems, target designators, rangefinders, displays, gyros, and holography.

Radiation emitted by lasers, if not shielded against, has the potential to damage human eyes, as well as light-sensitive devices that employ lens to focus light, such as photo-imaging devices and light sensors. Thus, it is desirable to produce a light-protective device, meaning a device capable of protecting eyes and other light-sensitive devices from potentially injurious light radiation, such as may be encountered with lasers. Various methods and devices for diffracting or filtering light, to protect against light radiation, are known in the art. In one method, an absorptive dye is incorporated into a lens element situated in the optical path of the eyes or a light-sensitive device. The dye acts as a filter and absorbs some undesired radiation. The use of absorptive dyes, however, has some disadvantages. For instance, the dyes used often are inherently wide band absorbing. The resultant wide band absorption has an undesirable effect of rejecting certain colors of an image viewed through the dye. This results in an image that is unsuitable for many applications.

In a second method, devices utilizing conventional multi-layered coatings may be applied to a substrate to protect objects from undesired light radiation. The multiple layers are chosen to diffract or filter various wavelengths of light depending on the coating of the particular layers. Unfortunately, many of these coatings are difficult to apply to complicated substrate shapes. As a result, limitations are placed on the useful applications of these coatings where complex-shaped substrates are involved.

The use of holograms, including transmission and reflection holograms, to diffract light radiation has been proposed as a solution to the problem of protecting against undesired radiation. The use of single-layer holograms, having multiple holographic images on a single holographic film, to diffract various wavelengths of incident radiation has been suggested to serve this purpose. The presence of multiple exposures within a single layer, however, tends to result in a lowering of index modulation. Consequently, image brightness is lowered, the result of which might lead to cross-talk between images, and more generally, to less efficient devices.

It also has been proposed to use laser reflective devices that employ a plurality of conterminous holograms, disposed on a substrate or adjacent substrates, to optimize reflection of undesired light radiation. See U.S. Pat. Nos. 4,601,533 and 4,637,678. These devices utilize multiple holograms, each having a predetermined fringe spacing, to reflect a given wavelength. The multiple holograms are bonded together with an additional adhesive layer, such as an epoxy. The use of multiple holograms has the advantage over single holograms in that it gives a wider angular coverage of wavelength reflection due to the ability to vary fringe spacing in the various layers. Thus the use of multiple layers improves reflectivity by the ability of each layer to reflect a different wavelength.

A disadvantage to the holographic light-protective devices disclosed in the above patents is that the multiple holographic layers are bonded to each other by the use of the additional adhesive layer. The additional adhesive layer tends to add undesirable thickness to the resultant device. Consequently, prior art devices are impractical for many applications where device thickness is an important consideration. Additionally, the presence of an adhesive layer renders difficult the registration of wave-fronts, and also of the holograms themselves. Therefore, efficient fabrication of these type of multi-layer holograms is inhibited by the presence of the adhesive layer.

The use of multi-color holography is described in connection with using a film of multiple color sensitivities in U.S. Pat. No. 3,442,566.

In short, it is desirable to produce on a variety of substrate surfaces a device employing multiple holograms which exhibits excellent light-protective characteristics and has a relatively thin cross-sectional thickness. The literature, however, fails to provide a teaching as to how to overcome one or more of the problems discussed above.

SUMMARY OF THE INVENTION

Pursuant to the present invention, a method is disclosed for forming a holographic device having multiple layers. The method includes the steps of forming a first hologram on a major surface of a substrate. The first hologram is desensitized to prevent interaction with a second subsequently formed hologram. A second hologram is formed conterminous with the first hologram.

Among the advantages of the present invention is that multiple layer holograms can be formed on a variety of substrate shapes by bonding together multiple holograms absent an additional adhesive layer. Devices produced according to the methods of the present invention exhibit improved efficiency due to decreased cross-talk, i.e. interference between layers. The improved performance characteristics of devices prepared according to the methods of the present invention render the devices suitable for many previously impractical applications.

BRIEF DESCRIPTION OF THE DRAWINGS

The various advantages of the present invention will become apparent to one skilled in the art by reading the following specifications and by reference to the drawings in which.

DESCRIPTION OF THE PREFERRED EMBODIMENT

Figure 1:
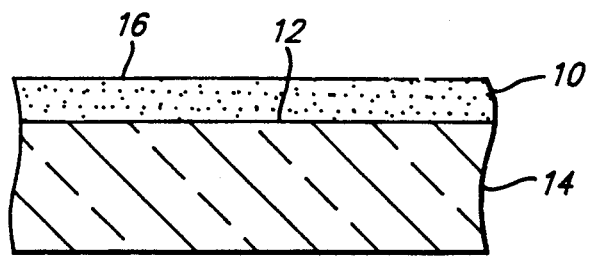
FIGS. 1-3 are cross-sectional views of a multiple layer holographic device during various steps in the formation process.

Referring to FIG. 1, the first step to produce a multilayer holographic light-protective device, such as a laser reflective device or other light-diffracting devices, is to form a first hologram in a photosensitive layer 10 coated on a major surface 12 of a substrate 14 having a predetermined thickness. Suitable substrates for the present invention include, without limitation, transparent substrates such as photographic grade mylar, polycarbonate, glass, polyester, and cellulose acetate.

The thickness of the substrate 14 varies with the application for which the device is employed, and the material used as the substrate. For instance, for a glass substrate, a thickness of about ¼ inch would be suitable for the present invention. A mylar substrate, however, may be employed having a thickness as small as 1/1000 of an inch.

To form the first hologram, the first photosensitive layer 10, i.e. the first holographic recording medium or film, is coated to a predetermined thickness on the surface 12 of the substrate 14. The photosensitive layer 10 has an exposed major surface 16. Preferably, the first layer 10 is a photosensitive material such as a dichromated gelatin, which is coated onto the surface 12 of the substrate 14 by conventional means including, but not limited to, dip coating, spin coating, casting, and spraying. Dichromated gelatin, as referred to herein, is a photosensitive gelatin material containing about 6% ammonium dichromate. Other holographic recording media can be used, with some modification to the methods of the present invention, to yield a multi-layer light-diffracting holographic device. Those other media include silver halide film, and suitable photopolymers. In the present embodiment, the thickness of the first layer 10, after it has dried, should be about 5 to about 30 micrometers.

The first layer 10 is then dried to a predetermined moisture content. Preferably, the layer 10 is air-dried to equilibrium in an atmosphere having a relative humidity of about 5% to about 30%. In a typical multi-layer holographic device prepared according to this process, the first layer 10 of dichromated gelatin is dried to a moisture content of about 1% to about 10%. The moisture content in the layer 10 that is selected is an important factor to determine the photosensitivity of the dichromated gelatin. Because of its effect on the important steps for holograph formation of shrinking or swelling the layer 10, the moisture content that is selected governs partially the wavelength of the resultant hologram. Thus, the moisture content will depend on the desired wavelength in the hologram. The moisture content also should take into account interaction between the first layer 10 and a subsequently applied second photosensitive layer.

After drying the first holographic layer to a suitable moisture content, a first latent holographic image, i.e. a hologram, having a first holographic fringe configuration formed therein is formed within the photosensitive gelatin. The hologram is constructed using known methods such as those described in Smith, *Principles of Holography*, John Wiley & Sons, 2d ed. 1975, which is hereby expressly incorporated by reference. Holographic fringes that are formed in the gelatin are areas of high and low indices of refraction corresponding in space to the interference pattern formed at the intersection of two coherent beams supplied by a laser.

Upon completion of the ultimate holographic device, the first hologram will serve in combination with subsequent holograms to diffract incident light radiation. To maximize diffraction, it should be recognized that a variety of fringe configurations, i.e. fringe shapes, spacings, and slant angles may be employed in the present invention. That is, to optimize diffraction for a particular application, fringe shapes, spacings, and slant angles can be varied within a single hologram. In addition, multiple holograms, each having different fringe configurations may be combined to improve diffraction. In the present preferred embodiment fringes are disposed substantially parallel to the surface 12 of the substrate 14 to form a reflection holographic device. It should be realized by one skilled in the art that transmission holograms may be prepared according to the methods of the present invention wherein fringes are disposed substantially perpendicular to the surface 12 of the substrate 14.

At this point, steps are taken to desensitize the first layer 10 having the first hologram formed therein, to prevent interaction between the first hologram and a second subsequently formed hologram during later processing steps. The term desensitizing, as used herein, refers to a removal of photoreactive material from photosensitive material. In the present embodiment, this refers to removal of ammonium dichromate from the gelatin. The effect of such a removal, in the present invention, is to reduce the efficiency of the first photosensitive layer 10, and thereby minimize potential adverse effects on the first hologram during a subsequent exposure of a second hologram. Further, when the first layer 10 has been desensitized it makes possible the formation of additional holograms thereon without the need to apply an intermediate adhesive layer.

Ammonium dichromate is removed from the first holographic recording medium 10 by washing it from the gelatin to give a modified, but still latent, image in the first layer 10. An additional effect of this washing step is to cause the first layer 10 to swell or expand in areas related to the hologram exposure and thereby amplify the material's refractive index modulation. The amplification should correspond to the holographic image formed within the layer. Preferably, the ammonium dichromate is washed from the gelatin using a water solution containing a suitable amine, and having a pH of less than 12. More preferably, the pH of the solution should be limited to about 10. In the present embodiment, a suitable solution contains water and triethanol amine having a concentration of about 0.03 to 1.0 molar. Other suitable solutions may contain, in addition to the above, ammonium hydroxide up to a concentration of about 0.05 molar. The temperature of the solution should take into account the hardness of the gelatin and the pH of the solution. For instance, in the present embodiment, the solution is maintained at about 15° C. to about 23° C.

After washing with the water solution it is preferable to dehydrate substantially the first gelatin layer 10 to partially develop the image on the surface and in the volume of that layer. It is preferable to rapidly dehydrate the first gelatin layer 10 in an alcohol bath. In the present embodiment, the alcohol bath should consist of a series of alcohol baths maintained at a temperature of about 15° C. to 25° C. For instance, the first layer 10 should be dehydrated by washing the layer in a series of 2-propanol baths having consecutive concentrations of about 50%, 75%, 90% and 100% 2-propanol. The layer should remain in each bath for about five minutes. In some applications, however, varying the gelatin used as the photosensitive layer 10 may require a different washing time. In most cases, however, the washing time will range from about one to about ten minutes.

During subsequent steps of exposing a second hologram it is preferable to avoid introducing unnecessary interference into a desired interference pattern. A potential source of undesirable interference is diffraction of laser light off of fully developed fringes of the first hologram. To minimize this type of undesirable interference, it is preferred to partially develop the first holograms thereby delaying full development of the image in the first hologram until after the second hologram has been exposed. The term partially develop refers to the processing of a hologram to render an image that is less than the optimum efficiency of the hologram. For instance, in the present application partial development of a 20 micron thick dichromated gelating hologram should render an image having an efficiency of about 5% to about 50%. It should be recognized, however, that subsequent processing involving the first and second holograms will fully develop the image in both holograms so that the ultimate efficiency therein will be about 99%.

The extent of development of the image can be controlled by avoiding complete dehydration of the first layer 10 of gelatin. For instance, complete dehydration can be prevented by processing the gelatin at a temperature in the range of about 1° to 2° below the optimum processing temperature, wherein the optimum processing temperature would be one that would produce an image of full intensity in the recording medium 10. Depending on the hardness of the gelatin, an optimum range of processing temperatures for this step would be about 18° C. to about 25° C. Alternatively, complete dehydration could be prevented by dehydrating for about 5 minutes in a dilute alcohol solution, such as one employing about 75% 2-propanol and about 25% water maintained at a temperature of about 18° C. to about 25° C.

It is preferable, at this stage, to begin to generate within the first hologram a desired peak wavelength for which light protection is sought. The peak wavelength depends on fringe spacing within the hologram, as well as layer thickness. It should be recognized, however, that subsequent to the present step, the wavelength within the first hologram may change due to processing of the second subsequent hologram. Therefore, the conditions for this step are predetermined to yield a desired peak wavelength, taking into account subsequent processing steps.

To begin to generate the desired wavelength, the first hologram is baked at a temperature of about 50° C. to about 100° C. for a predetermined amount of time necessary to approach the desired wavelength. In the present preferred embodiment, this requires heating the first hologram for a period of about two days to about two weeks. Apart from beginning to generate the desired wavelength in the holographic image, the heating step serves an additional purpose of surface hardening the first gelatin layer 10. The surface hardening of the first gelatin layer 10 serves to assist prevention of interaction between the first hologram and a second layer that is subsequently applied.

Figure 2:
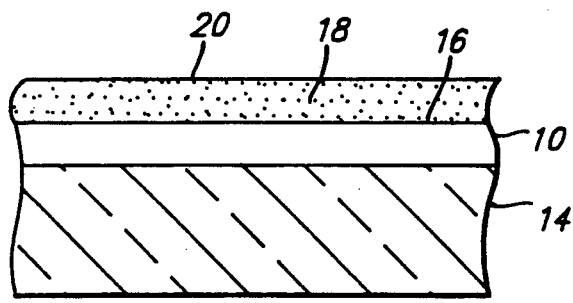

At this point, the first hologram has been formed, desensitized, and thereby rendered substantially insoluble for subsequent processing steps. Referring to FIG. 2, a second photosensitive layer 18 having a predetermined thickness is then applied to the exposed surface 16 of the first hologram which has been desensitized. In the present embodiment, the second layer should have a thickness of about 5 to about 30 micrometers. It should be noted that due to the moisture introduced into the first hologram by the addition of the second layer 18, the light-diffracting effects of the first hologram are substantially erased. The latent image, however, remains intact within the first layer 10 and again will be rendered capable of light-diffraction, i.e. redeveloped upon completion of subsequent steps.

The second layer 18, having a major surface 20, is provided to form a second hologram conterminous with said first hologram. The second layer 18 is applied conterminous with the first hologram, and is bonded to the first hologram without the need for an additional adhesive layer, such as epoxy or other suitable glue. The second photosensitive layer 18 is a holographic recording medium, preferably a dichromated gelatin, similar to the gelatin of the first hologram. The second layer 18 is applied to the surface 16 of the first layer 10 by conventional methods such as dip-coating, casting, spin coating, spraying, or doctor blading the material. Doctor blading is a process that involves spreading gelatin over a substrate with a blade spaced at a predetermined distance above the substrate.

It is important that throughout the steps of applying the second layer 18, a temperature is maintained to prevent melting or dissolution of the gelatin in the first holographic layer 10. Preferably the temperature for the processing steps for the second layer 18 should be less than about 50° C. More preferably it should be between about 25° C. to about 40° C. This temperature range is chosen to avoid temperature related problems such as inadequate adhesion between layers; undesirable refractive index due to non-uniform coverage gradients; and bleeding of dichromate between the first and second layers, which leads to undesired cross-talk between layers.

It is also important during this processing sequence to mix ammonium dichromate into the gelatin of the second layer at the time of coating rather than during a subsequent soaking procedure as is sometimes done in the art. The purpose of this is to prevent leaching of the dichromate into both gelatin layers and thereby photosensitizing undesirably the first layer 10.

After the second layer 18 of gelatin has been applied, the coatings are dried to a predetermined moisture content in a manner similar to the previous step of drying the first gelatin layer 10. Again, attention should be paid to maintaining temperature below 50° C., preferably in the range of about 20° C. to about 25° C. That is, this drying of all subsequent layers is done at or near room temperature.

A second hologram is then formed in the second layer by exposing the layer to a suitable laser light source in a manner similar to the previously described formation of the first hologram. The second hologram will have a second fringe configuration formed therein. It should be recognized that because the first hologram has not yet been processed to develop an image at full intensity, and has been further reduced in intensity by the moisture in the coating of the second layer, it fails to detract appreciably the exposure light for the second hologram, thus enabling adequate exposure of the second hologram. The second layer is exposed to produce a hologram capable of diffracting light of a same or different wavelength as the first hologram.

The second hologram is then desensitized by washing ammonium dichromate from the gelatin in substantially the same manner as was used to desensitize the first hologram.

Figure 3:
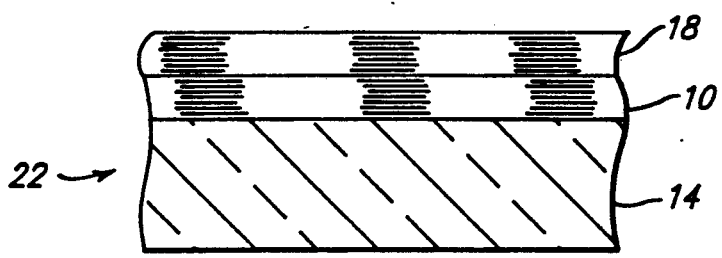

Referring now to FIG. 3, after the second layer has been exposed to form a holographic image, both the first and second holograms are processed together simultaneously to fully develop the holographic image already present in each. The temperature for this processing step is dependent in part on the combined thickness of the layer 10 and 18. For instance, when the combined thickness of the layers is greater than the about 35 micrometers, better results are obtained by first processing the layers at a temperature slightly below the optimum temperature to maximize more fully the removal of ammonium dichromate from the gelatin. For instance, good results are obtained by first processing layers at a temperature slightly below the optimum temperature, i.e. about 19° C. to about 24° C., and then reprocessing the layers at a temperature of about 20° C. to about 25° C.

In the latter processing step of reprocessing at a temperature of about 20° C. to about 25° C. substantially all of the excess dichromate still remaining in the gelatin of the first and second holograms is removed from the gelatin without disturbing the integrity of the gelatin film.

After the holograms have been processed to remove substantially all of the remaining excess ammonium dichromate, they are heated for a predetermined amount of time. Preferably the holograms are heated in an oven at a temperature of about 60° C. for about two hours. The holograms are then heated at a temperature of about 60° C. to about 120° C. for a period of about one day to about two weeks. The purpose of this heating step is to shift the spacing of holographic fringes and thereby achieve a predetermined wavelength spacing between holographic fringes of the first and second holograms. Processing according to these steps, where the fringes formed within the holograms are parallel to the substrate surface, should yield a device 22 capable of diffracting light having a wavelength of about 400 to about 1,200 nanometers.

Figure 4:
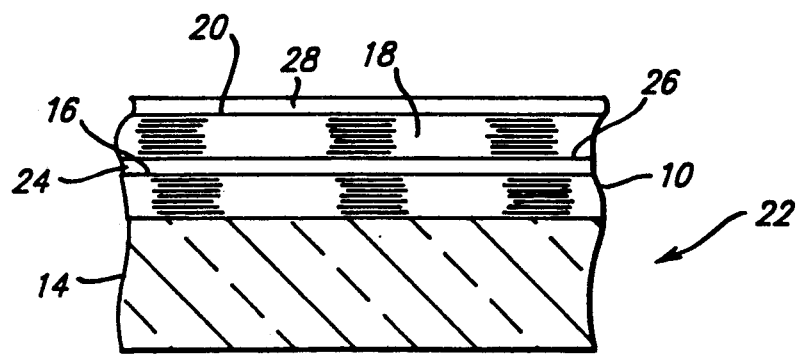
FIG. 4 is a cross-sectional view of an alternative embodiment.

Referring to FIG. 4, it should be noted that in a highly preferred embodiment of the present invention, a device 22 is formed having a first clear non-photosensitive gelatin layer 24 disposed adjacent and conterminous with the surface 16 of the first hologram and a surface (26) of the second hologram. The device 22 also has a second clear non-photosensitive gelatin layer 28 formed on the major surface 20 of the second hologram 18. The clear gelatin layers 24 and 28 serve, in part, as an interface between holograms, to prevent distortion of fringes of the first and second holograms during the steps of forming the device 22.

The first non-photosensitive layer 24 can be formed on the first photosensitive gelatin layer 10 by exposing the gelatin layer to ultraviolet light in an amount suitable to surface harden the major surface 16 of the gelatin layer 10 to a depth of about 2 to about 5 microns. This surface hardening step can be performed prior to or subsequent to the formation of the first hologram. The effect of surface hardening the photosensitive layer 10 is to form a clear non-photosensitive layer 24 from the existing gelatin of the gelatin layer 10. It should be recognized that to accommodate for this surface hardened layer additional gelatin may need to be added to the first gelatin layer 10. Ultraviolet light, supplied by a suitable source such as a mercury vapor lamp (having a 366 nanometer line) maintained at about 0.1 watts/cm$^2$ for about 0.1 to about 1 second, should adequately surface harden the gelatin layer 10 and form the first non-photosensitive layer.

Alternatively, the first photosensitive layer 10 can be surface hardened and a first non-photosensitive layer formed subsequent to the steps of exposing and processing the first hologram, by first treating the layer 10 in a suitable aldehyde solution. For instance, the first layer 10 can be surface hardened by soaking it in a 0.1% formaldehyde solution for about one minute prior to soaking it in a swelling bath. Other chemical hardening agents may be used and include photographic fixer solution containing hardener.

After surface hardening the major surface 16, the first non-photosensitive layer 24 is applied to the surface of the first photosensitive gelatin layer 10. Preferably, the non-photosensitive gelatin layer is prepared from a clear gelatin such as the gelatin used in the photosensitive layers 10 and 18. The non-photosensitive gelatin layers, however, should not contain ammonium dichromate. Such gelatins include, without limitation, cooked pigskin or collagen. The first non-photosensitive layer 24 is coated onto the surface 16 of the first photosensitive layer 10, in a manner similar to the coating of the second photosensitive layer 18 described above. The preferred thickness of the layer 24 should be about 2 to about 5 micrometers.

Upon forming the first non-photosensitive gelatin layer 24 on the surface of the first photosensitive layer 10, the non-photosensitive layer 24 is dried and hardened by heating it in an oven at a temperature of about 60° C. for about one to about two hours. The non-photosensitive layer 24 is allowed to further dry to a predetermined moisture content by drying in about 30% relative humidity or about eight to twenty-four hours, prior to placing it in the oven maintained at about 60° C. Preferably the moisture content of the non-photosensitive layer should be about 1% to about 5%.

The second photosensitive gelatin layer 18 is then prepared and applied to an exposed major surface 26 of the first non-photosensitive layer 24 using methods previously described herein for coating the second photosensitive layer 18.

The second non-photosensitive gelatin layer 28 is then applied to the surface 20 of the second photosensitive layer 18, as a solution, and allowed to dry to form the clear layer. Upon applying the second non-photosensitive gelatin layer 28 to the surface 20 of the second photosensitive layer 18, the second non-photosensitive gelatin layer 28 should be heated to a temperature less than 50° C. to prevent remelting of the first hologram and avoid interaction between the first hologram and the second photosensitive layer. The second non-photosensitive layer is then dried in a manner substantially the same as the first non-photosensitive layer. It should be recognized that the second hologram has been formed, in the second photosensitive layer 18 pursuant to steps previously described herein for forming holograms, prior to the addition of the second non-photosensitive gelatin layer. The layers are then processed as previously described in the description of the preferred embodiment to yield a completed device 22.

It should be noted that while this invention has been described in connection with forming a hologram having two layers, multiple additional layers can be applied by repeating the steps previously described, paying careful attention to maintaining temperature of subsequent steps at processing temperatures below processing temperatures of previous steps to avoid the problems previously discussed herein.

Multiple layer reflection holograms prepared according to the methods of the present invention have exhibited optical densities of over 2.0, and above 99% reflection efficiency, for each of the holographic layers. Additionally cross-talk between layers in an embodiment not having a clear gelatin interface has been observed to be less than about 1%.

It should be understood, while this invention has been described in connection with one preferred example, that other modifications will be apparent to one skilled in the art after a study of the specification, drawings and following claims.

What is claimed is:

1. A method of forming a holographic device, said method comprising the steps of:
   (a) forming a first hologram on a major surface of a substrate with following steps:
      (i) first, providing a photo-sensitive layer comprising photoreactive material and photosensitive material,
      (ii) second, drying said photosensitive layer to a predetermined moisture content,
      (iii) third, exposing said photo-sensitive layer to create a latent image, and
   (b) desensitizing by removing said photoreactive material from said photosensitive material from said first hologram to prevent interaction with a second subsequently formed hologram;
   (c) forming the second subsequently formed hologram conterminous with said first hologram, with the following steps:
      (i) first, providing a photosensitive layer on said first hologram,
      (ii) second, drying said photosensitive layer to a predetermined moisture content,
      (iii) third, exposing said photosensitive layer to create a latent image, and
   (d) processing together said first and second holograms to fully develop the holographic image and to achieve a predetermined fringe configuration in the first and second holograms, so that the holograms of said device are bonded together absent an adhesive layer between said first and second holograms.

2. The method of claim 1 wherein step (b) comprises:
   (1) washing the first hologram to remove photo-reactive material therefrom and to desensitize said first hologram to incident light radiation;
   (2) dehydrating substantially said first hologram to partially develop the hologram so as to desensitize said first hologram;
   (3) heating said first hologram for a predetermined amount of time so as to form within the first hologram a desired fringe spacing which reflects light at a peak wavelength for which light diffraction is sought, and to surface harden said first hologram so that subsequent coatings will not damage said first hologram; and
   (4) coating a subsequent photosensitive layer on said first hologram, thereby introducing moisture into said first hologram and thereby temporarily lowering its diffraction efficiency.

3. The method of claim 1 wherein said photosensitive layer is a gelatin containing ammonium dichromate.

4. The method of claim 1 wherein said photosensitive layer is air dried.

5. A method of forming a holographic device, said method comprising the steps of:
   (a) forming a first hologram on a major surface of a substrate with the following steps:
      (i) first, providing a photosensitive layer comprising photoreactive material and photosensitive material,
      (ii) second, drying said photosensitive layer to a predetermined moisture content,
      (iii) third, exposing said photosensitive layer to create a latent image, and
   (b) desensitizing by removing said photoreactive material from said photosensitive material from said first hologram to prevent interaction with a second subsequently formed hologram;
   (c) forming the second subsequently formed hologram conterminous with the first hologram, with the following steps:
      (i) first, providing a photosensitive layer on said first hologram,
      (ii) second, drying said photosensitive layer to a predetermined moisture content,
      (iii) third, exposing said photosensitive layer to create a latent image, and
   (d) desensitizing by removing said photoreactive material from said photosensitive material from said second hologram to prevent interaction with a third subsequently formed hologram;
   (e) forming the third subsequently formed hologram conterminous with the second hologram, with the following steps:
      (i) first, providing a photosensitive layer on said second hologram,
      (ii) second, drying said photosensitive layer to a predetermined moisture content,
      (iii) third, exposing said photosensitive layer to create a latent image, and
   (f) processing together said first, second and third holograms to fully develop the holographic image and to achieve a predetermined fringe configuration in the holograms,
   so that the holograms of said device are bonded together absent an adhesive layer between the respective holograms.

6. A method of forming a holographic device, said method comprising the steps of:
   (a) forming a first hologram on a major surface of a substrate with the following steps:
      (i) first, providing a photo-sensitive layer, comprising photoreactive material and photosensitive material,
      (ii) second, drying said photosensitive layer to a predetermined moisture content,
      (iii) third, exposing said photosensitive layer to create a latent image, and
   (b) desensitizing by removing said photoreactive material from said photosensitive material from said first hologram to prevent interaction with an adjacent subsequently formed holgram; and
   (c) forming a plurality of subsequently formed holograms conterminous with the first hologram, with the following steps:
      (i) first, providing a photosensitive layer on a last prior hologram,
      (ii) second, drying said photosensitive layer to a predetermined moisture content,
      (iii) third, exposing said photosensitive layer to create a latent image, and
   (d) desensitizing each hologram by removing said photoreactive material from said photosensitive material from said hologram to prevent interaction with the next adjacent subsequently formed hologram;

(e) processing together all holograms to fully develop the holographic image and to achieve a predetermined fringe configuration in the holograms, so that the holograms of said device are bonded together absent an adhesive layer between the respective holograms.

7. A method of forming a multi-layer holographic device, said method comprising the steps of:

(a) coating a major surface of a substrate with a first photosensitive gelatin layer;

(b) drying said first photosensitive-gelatin layer to a predetermined moisture content;

(c) exposing said first photosensitive layer to form a first hologram having a first holographic fringe configuration formed therein;

(d) removing ammonium dichromate from said first gelatin layer so as to desensitize said layer;

(e) partially dehydrating said first gelatin layer in an alcohol bath to partially develop the first holographic image;

(f) heating said first gelatin layer for a predetermined amount of time so as to form within the hologram a desired fringe spacing which reflects light at a peak wavelength for which light diffraction is sought, and to surface harden said first gelatin layer;

(g) coating at a temperature of less than about 50° C., a major surface of said first gelatin layer with a second photosensitive layer so that the light-diffracting effects of the first hologram are substantially erased;

(h) exposing said second photosensitive layer to form a second hologram having a second holographic fringe configuration formed therein; and (i) processing together said first and second layers to fully develop the holographic image and to achieve a predetermined fringe configuration in the first and second holograms.

8. The method of claim 7 wherein said first photosensitive layer is gelatin having about 6% ammonium dichromate therein.

9. The method of claim 7 wherein said first photosensitive layer is air dried to a moisture content of about 1% to about 10%.

10. The method of claim 7 wherein the ammonium dichromate is removed from the first gelatin layer by washing said first layer in a water solution containing a suitable amine, maintained at a temperature of about 15° C. to about 23° C.

11. The method of claim 7 wherein the first gelatin layer is partially developed by washing it in a 2-propanol bath, having a concentration of about 75% 2-propanol, for about 5 minutes.

12. The method of claim 7 wherein the first gelatin layer is heated at a temperature of about 50° C. to about 100° C. to begin to generate within the first hologram a desired peak wavelength for which light diffraction is sought, and to surface harden said first gelatin layer.

13. The method of claim 7 wherein the second photosensitive gelatin layer is applied at a temperature in the range of about 25° C. to about 40° C.

14. The method of claim 7 wherein ammonium dichromate is mixed into the gelatin of said second photosensitive layer at the time of coating the gelatin on said first layer.

15. The method of claim 7 wherein step (i) comprises:

(1) processing the first and second holograms to remove substantially all of the remaining excess ammonium dichromate; and (2) heating the holograms to shift the spacing of holographic fringes to achieve a predetermined wavelength spacing between the holographic fringes of the first and second holograms.

* * * * *